United States Patent [19]
Baril et al.

[11] Patent Number: 5,535,053
[45] Date of Patent: Jul. 9, 1996

[54] NIGHT VISION GOGGLE ASSEMBLY WITH INDEPENDANT MONOCULAR DEVICES

[75] Inventors: Albert M. Baril; Roy H. Holmes, both of Roanoke; Mark R. Critzer, Salem, all of Va.

[73] Assignee: ITT Corporation, New York, N.Y.

[21] Appl. No.: 290,249

[22] Filed: Aug. 15, 1994

[51] Int. Cl.$^6$ .............................. G02B 23/00; H01J 40/14
[52] U.S. Cl. .......................... 359/409; 359/411; 359/413; 250/214 VT
[58] Field of Search ..................................... 359/404, 407, 359/409, 410, 400, 480, 413, 411; 250/214 VT

[56] References Cited

U.S. PATENT DOCUMENTS

| | | |
|---|---|---|
| 2,144,558 | 3/1985 | Ellis . |
| 2,179,543 | 3/1987 | Paine . |
| 2,195,187 | 3/1988 | Ellis . |
| 3,889,190 | 6/1975 | Palmer . |
| 4,449,787 | 5/1984 | Burbo et al. . |
| 4,651,951 | 9/1987 | McCarthy et al. . |
| 4,689,834 | 3/1987 | McFarlane . |
| 4,711,411 | 12/1987 | Copp . |
| 4,734,939 | 4/1988 | Copp . |
| 4,918,752 | 4/1990 | Briggs . |
| 4,953,963 | 9/1990 | Miller . |
| 5,121,045 | 6/1992 | Caserta et al. . |
| 5,176,342 | 1/1993 | Schmidt et al. . |
| 5,179,735 | 1/1993 | Thomanek . |
| 5,254,852 | 10/1993 | Filipovich et al. ............... 250/214 VT |
| 5,307,204 | 4/1994 | Dor ............................................ 359/400 |
| 5,331,459 | 7/1994 | Dor ............................................ 359/409 |
| 5,361,162 | 11/1994 | Goebel .................................... 359/411 |
| 5,396,069 | 3/1995 | Craig et al. ............................. 250/330 |
| 5,408,086 | 4/1995 | Morris et al. ..................... 250/214 VT |
| 5,420,828 | 5/1995 | Geiger ..................................... 367/131 |
| 5,446,585 | 8/1995 | Morley et al. ......................... 359/411 |

Primary Examiner—Paul M. Dzierzynski
Assistant Examiner—Mohammad Y. Sikder
Attorney, Agent, or Firm—Arthur L. Plevy; Patrick M. Hogan

[57] ABSTRACT

A modular night vision device wherein either one or two night vision monocular assemblies can be joined to a common mount to selectively create either a monocular night vision apparatus or a binocular night vision apparatus. Electrical contacts are present on the night vision monocular assemblies that couple to the common mount. The electronic controls and power source needed to operate the night vision monocular assemblies are contained within the common mount. Accordingly, the night vision monocular assemblies automatically become disabled when detached from the common mount. The common mount provides interpupillary and distance-to-eye adjustments for the night vision monocular assemblies. Additionally, the common mount enables the night vision monocular assemblies to be flipped up to a stowed position out of the field of view of the person utilizing the night vision device.

16 Claims, 3 Drawing Sheets

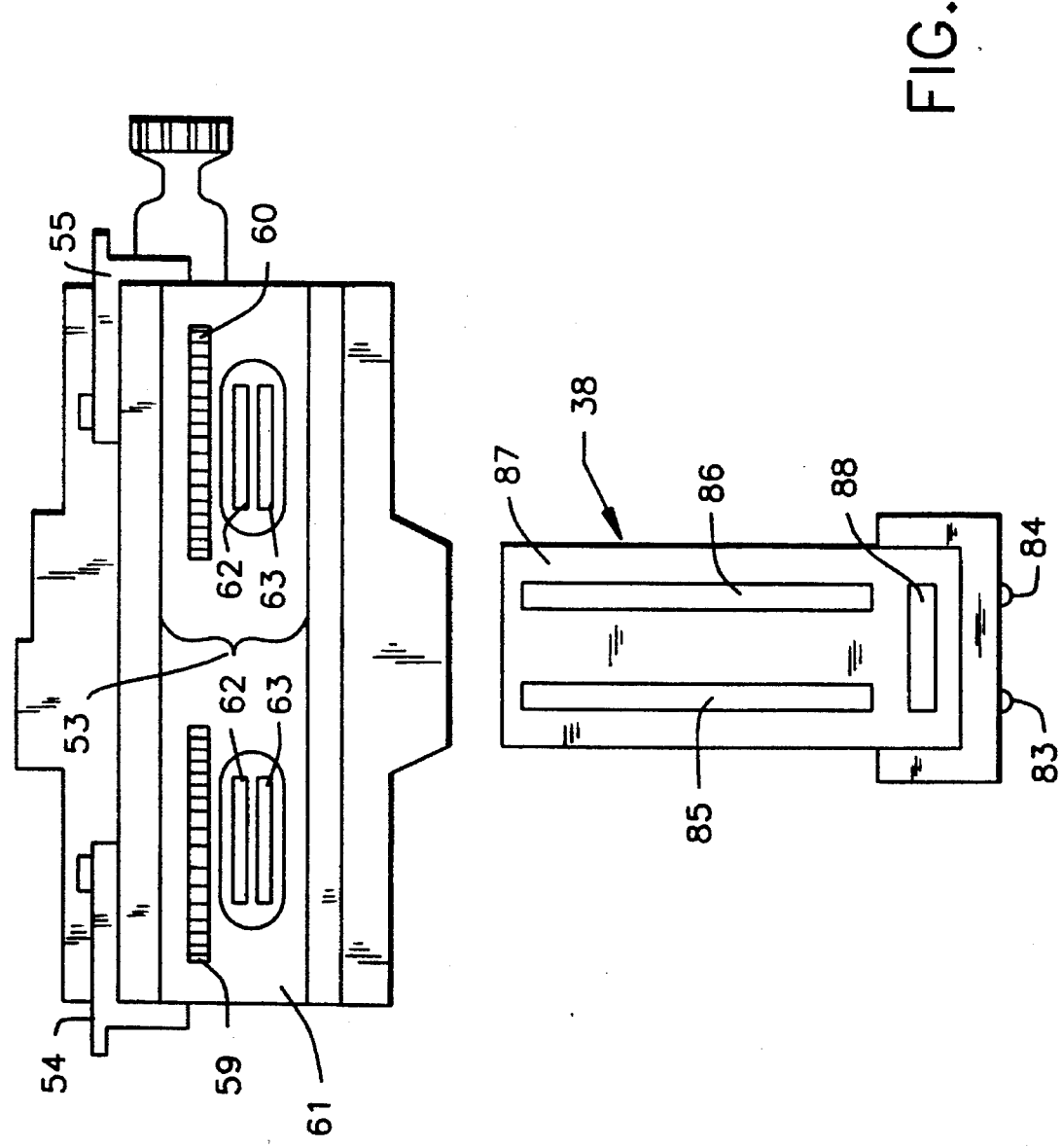

NIGHT VISION GOGGLE ASSEMBLY WITH INDEPENDANT MONOCULAR DEVICES

FIELD OF THE INVENTION

The present invention relates to night vision goggle assemblies such as those used by soldiers in the U.S. Army and other military organizations. More particularly, the present invention relates to night vision goggle assemblies that use modular monocular devices that enable a soldier to selectively use a single monocular or combine two monoculars to create a binocular assembly.

DESCRIPTION OF THE PRIOR ART

Night vision devices are widely used in the military to provide soldiers, aviators and sailors with the ability to view objects at night or during other low light conditions. Night vision devices are traditionally manufactured as monocular assemblies or binocular assemblies depending upon the application being addressed. For instance, most night vision devices used by aviators are produced as binocular assemblies. This provides the pilot with the needed depth perception as the pilot flies during low light conditions. Examples of such night vision binocular devices are shown in U.S. patent application Ser. No. 08/018,117 to Baril, entitled HELMET MOUNTING FOR NIGHT VISION ASSEMBLY; U.S. Pat. No. 4,449,783 to Burbo et al.,entitled NIGHT VISION IMAGING SYSTEM ADAPTED FOR HELMET MOUNTING; and U.S. Pat. No. 4,734,939 to Copp, entitled AIRCREW HEADGEAR, wherein the first two examples are assigned to ITT Corporation, the assignee herein.

Monocular night vision devices commonly serve dedicated purposes, such as a gun sight or a camera lens, however there are many handheld "spotting scopes" used both commercially and by the military. Examples of such monocular devices are shown by U.S. Pat. No. 5,084,780 to Phillips, entitled TELESCOPIC SIGHT FOR DAY/NIGHT VIEWING; U.S. Pat. No. 5,029,963 to Naselli, entitled REPLACEMENT DEVICE FOR A DRIVER'S VIEWER; and U.S. patent application Ser. No. 08/152,193, emitted MONOCULAR NIGHT VISION DEVICES, all of which are assigned to ITT Corporation, the assignee herein.

A soldier in the field does not always use his/her night vision equipment even in low light conditions. Night vision devices severely limit a soldier's field of view and may prevent the soldier from properly sighting his/her weapon. Accordingly, many soldiers prefer portable night vision assemblies that can be held to the eyes when needed and then quickly removed. Night vision devices that mount to a soldier's helmet often have "flip-up" hinges so that the night vision device can be quickly flipped to a stowed position and removed from the soldier's field of view. Such night vision devices are exemplified by U.S. Pat. No. 5,179,735 to Thomanek, entitled OPTICAL EQUIPMENT MOUNTING DEVICE; U.S. Pat. No. 5,176,342 to Schmidt et al., entitled GOGGLE EMERGENCY RELEASE APPARATUS; and U.S. Pat. No. 4,953,963 Miller, entitled AVIATOR'S NIGHT VISION SYSTEM.

From the variety of night vision devices that exist, it can be seen that depending upon the circumstances a soldier, aviator or other military personnel may require night vision binoculars, a night vision monocular, a helmet mounted night vision device, a weapon mounted night vision device or a portable handheld night vision device. Currently, most all prior art night vision devices are dedicated units. Accordingly, the soldier, aviator or other must make due with the one type of night vision he or she is assigned even if that night vision device does not fit the circumstances.

It is therefore an objective of the present invention to provide a modular night vision system where independent night vision monocular assemblies can be selectively used by a soldier to create a binocular device, a monocular device or a portable device as needed in the field.

It is a further objective of the present invention to provide a head mounting assembly for a modular night vision device, whereby one or two monoculars can be mounted in front of the eyes of a user and either the one or two monoculars can be turned upwardly into a stowed position.

SUMMARY OF THE INVENTION

The present invention is a modular night vision device wherein either one or two night vision monocular assemblies can be selectively joined to a common mount to create either a monocular night vision apparatus or a binocular night vision apparatus, as desired. Electrical contacts are present on the night vision monocular assemblies that couple to the common mount. The electronic controls and power source needed to operate the night vision monocular assemblies are contained within the common mount. Accordingly, the night vision monocular assemblies automatically become enabled when attached to the common mount. The common mount provides interpupillary and distance-to-eye adjustments for the night vision monocular assemblies. Additionally, the common mount enables the night vision monocular assemblies to be flipped up to a stowed position out of the field of view of the person utilizing the night vision device.

In a preferred embodiment, the common mount contains a receptacle for holding the batteries that empower the night vision monocular assemblies. The common mount also contains an automatic shut off control that turns off the night vision monocular assemblies when the ambient light surpasses a threshold brightness. An optional infrared light source may also be present within the common mount, wherein the infrared light source operates from the same battery source as the night vision monocular assemblies.

BRIEF DESCRIPTION OF THE DRAWINGS

For a better understanding of the present invention, reference is made to the following description of an exemplary embodiment thereof, considered in conjunction with the accompanying drawings, in which:

FIG. 3 is a bottom view of selective components of the present invention night vision device shown in FIG. 2, as viewed along prospective line 3—3.

DETAILED DESCRIPTION OF THE PRESENT INVENTION

Figure 1:
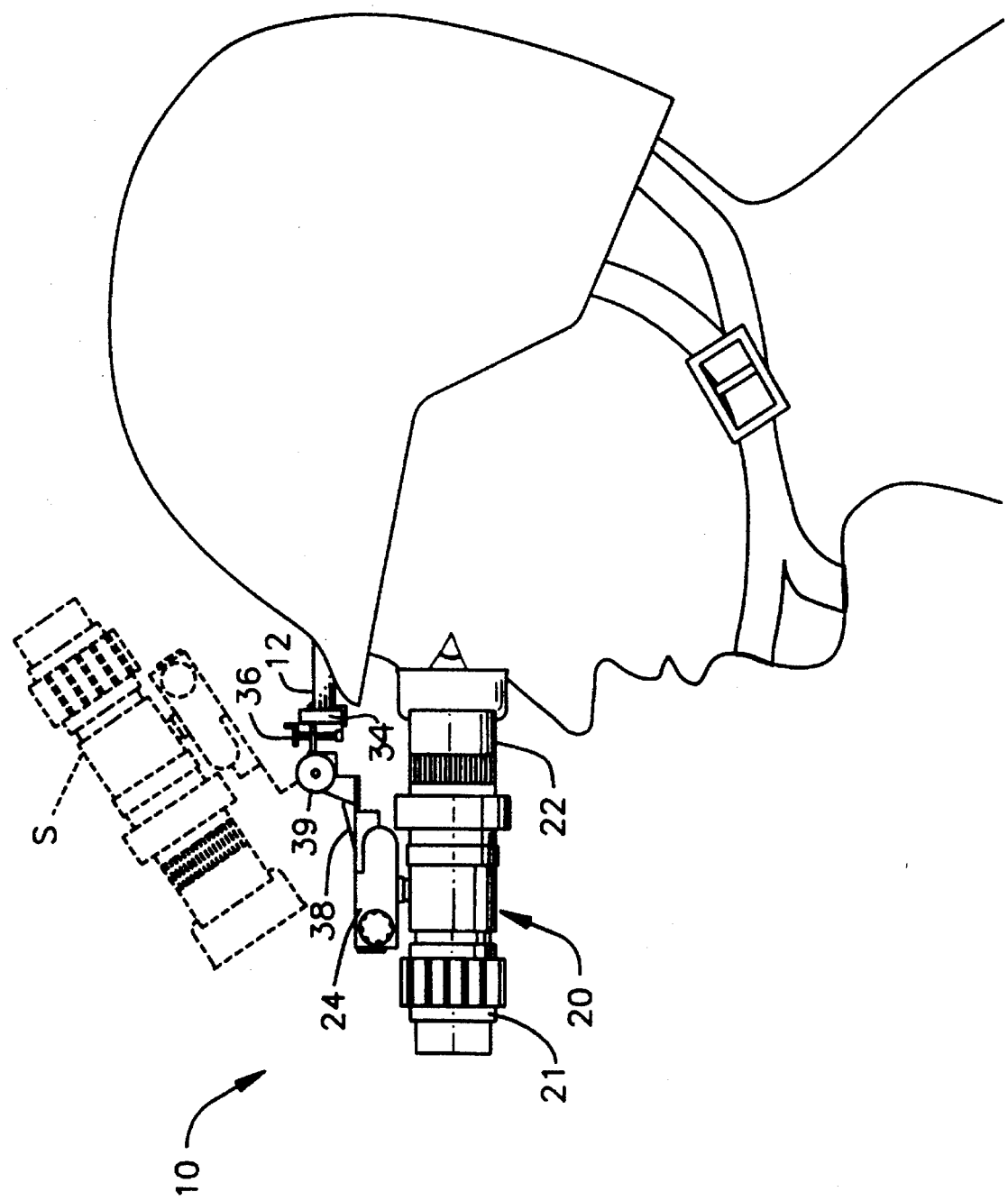
FIG. 1 is a side view of one preferred embodiment of the present invention night vision device shown worn in front of a user's eyes to facilitate further consideration and discussion.

Referring to FIG. 1, the present invention night vision assembly 10 is shown in conjunction with a helmet mount 12 that attaches to a soldier's helmet and holds the night vision assembly 10 in the proper position in front of the soldier's eyes. It should be understood that the shown use of the present invention night vision assembly 10 is merely exemplary and the night vision assembly 10 can be mounted to any other type of mount such as an aviator's helmet or a strapping mount that is worn on a soldier's head.

As is seen in FIG. 1, the night vision assembly 10 includes at least one night vision monocular device 20. In a preferred embodiment, the monocular device 20 utilizes a Generation III (GEN III) image intensifier tube disposed between an adjustable objective lens assembly 21 and an adjustable ocular lens assembly 22. The monocular device 20 is supported by an electronics housing 24. As will later be explained, the electronics housing 24 holds a power source (i.e. batteries), and the power supply circuitry needed to operate the GEN III image intensifier tube within the monocular device 20.

A mounting brace 34 extends from the helmet mount 12, on to which the night vision assembly 10 is coupled. A clamp assembly 36 engages the mounting brace 34 in a manner that will later be described. A guide member 38 is pivotably coupled to the clamp assembly 36. The guide member 38 joins the electronics housing 24 to the clamp assembly 36. Accordingly, the electronics housing 24 and the monocular devices 20 it supports are also pivotably coupled to the clamp assembly 36. This enables the monocular device 20 to be selectively rotated from the shown position in front of a soldier's eyes to a stowed position S outside the field of view (shown in hidden lines). As will later be explained, the guide member 38 and the monocular devices 20 it supports are locked into one set orientation and can be rotated between the shown horizontal position and the stowed positions S only upon the manipulation of the locking pin knob 39.

Figure 2:
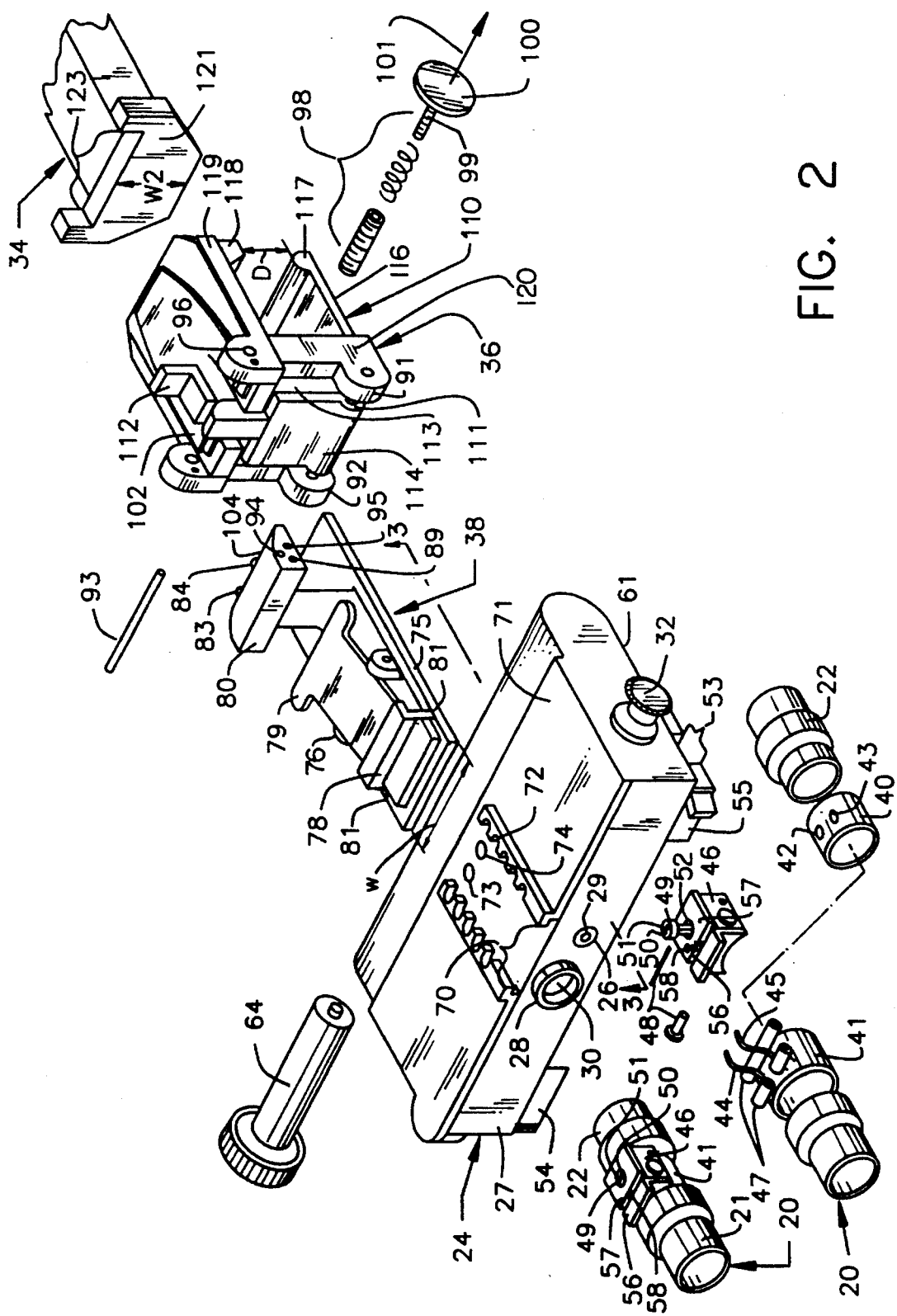
FIG. 2 is an exploded perspective view .of the embodiment of the present invention night vision device shown in FIG. 1.

Referring to FIG. 2 it can be seen that the electronics housing 24 has two apertures 26, 28 on its forward surface 27. The first aperture 26 contains a light sensor 29 therein. The light sensor 29 is coupled to an automatic turn-off circuit and/or an automatic gain control circuit that regulates the performance of the: GEN III image intensifier tube depending upon the amount of ambient light the light sensor 29 detects. The circuitry for automatically regulating the performance of a GEN III image intensifier tube is disclosed in U.S. Pat. No. 5,146,077 to Caserta et al. entitled, GATED VOLTAGE APPARATUS FOR HIGH LIGHT RESOLUTION AND BRIGHT SOURCE PROTECTION OF IMAGE INTENSIFIER TUBE; U.S patent application Ser. No. 08/024,410 to Caserta et al. entitled HIGH LIGHT RESOLUTION CONTROL OF AN IMAGE INTENSIFIER TUBE; and U.S. patent application Ser. No. 08/197,858 to Hertel, entitled EXPOSURE CONTROL SYSTEM FOR AN IMAGE DEVICE, all of which are, assigned to ITT Corporation, the assignee herein.

An infrared illuminator 30 is contained within the second aperture 28 on the forward surface 27 of the electronics housing 24. The infrared illuminator 30 produces a beam of near infrared light that is detectable by the GEN III image intensifier tube within each monocular devices 20. The infrared illuminator 30 and the monocular device 20 are activated by the control knob 32 on the side of the electronics housing 24. The operation of the control knob 32 is disclosed in U.S. Pat. No. 5,300,684, to Caserta et al. entitled IMPACT RESISTANT SWITCH KNOB, and assigned to ITT Corporation, the assignee herein.

Each monocular device 20 is comprised of a GEN III image intensifier tube 40 that is disposed within the tubular housing 41. The adjustable objective lens assembly 21 and the adjustable ocular lens assembly 22 attach to either end of the tubular housing 41, thereby creating the overall monocular device 20. The GEN III image intensifier tube 40 has two electrical contacts 42, 43 that extend throughout the exterior of the tube. The contacts 42, 43 engage an oppositely formed set of contacts (not shown) within the tubular housing 41. The contacts in the tubular housing 41 connect to lead wires 44, 45, as a result the lead wires 44, 45 are electrically coupled to the contacts 42, 43 on the image intensifier tube 40. A T-shaped guide member 46 connects to the night vision monocular device 20 via a bracket structure 47 formed on the exterior of the tubular housing 41. Various mechanical fasteners 48 couple the bracket structure 47 to the T-shaped guide member 46. An insulated grommet 49 is disposed within an aperture 52 on the top surface of the T-shaped guide member 46. Two spring loaded contact pins 50, 51 extend through the grommet 49, wherein the first contact pin 50 is coupled to the first lead wire 44 and the second contact pin 51 is coupled to the second lead wire 45. A groove, 56 is formed in the top surface 57 of the T-shaped guide member 46. A spring loaded ball stop 58 extends into the groove 56 for a purpose which will later be described.

The T-shaped guide member 46 fits within the T-shaped slot 53 formed on the bottom surface 61 of the electronics housing 24. Referring to FIG. 3 it can be seen that two flexible locking pawls 54, 55 obstruct the T-shaped slot 53 on either side. Accordingly, to pass the T-shaped member guide 46 (FIG. 2) into the slot 53, one of the flexible locking pawls 54, 55 must be elastically manipulated out of the way of the T-shaped slot 53. Serrated elements 59, 60 are disposed on the bottom surface 61 of the electronics housing 24 within the area of the T-shaped slot 53. As the T-shaped guide member 46 (FIG. 2) passes into the T-shaped slot 53, one of the serrated elements 59, 60 passes into the groove 56 in the top surface 57 of the T-shaped guide 46. (See FIG. 2) The serrated elements 59, 60 are therefore engaged by the spring loaded ball stop, 58 (FIG. 2), wherein the ball stop 58 biases the T-shaped guide member 46 onto a set position within the T-shaped slot 53. To adjust the position of the T-shaped guide member 46 within the T-shaped slot 53, lateral force is applied to the T-shaped guide 46 until the ball stop 58 yields and skips between the serrations on the serrated elements 59, 60.

Two conductive strips 62, 63 are disposed on the bottom surface 61 of electronics housing 24 within the area defined by the T-shaped slot 53. As the T-shaped guide member 46 (FIG. 2) is passed into the T-shaped slot 53, the spring loaded contact pins 50, 51 abut against the conductive strips 52, 53, thereby creating an electrical connection between the electronics housing 24 and the GEN III image intensifier tube 40 within each night vision monocular assembly 20. Referring again to FIG. 2 it can be seen that the electronics housing 24 holds batteries 64 as well as the image intensifier tube power supply and control circuitry, as before mentioned. The electrical contact of the spring loaded contact pins 50, 51 against conductive strips 62 and 63 (FIG. 3) on the bottom surface of the electronics housing 24 enable the circuitry and electrical power contained with the electronics housing 24 to electronically control the GEN III image intensifier tube 40 within the night vision monocular device 20.

As has been described, each night vision monocular device 20 is joined to the electronics housing 24 by the passage of the T-shaped guide member 46 into the T-shaped slot 53 after one of the flexible locking pawls 54, 55 has been manually manipulated out of the way. Accordingly, it will be understood that either one or two night vision monocular devices 20 can be selectively coupled to the electronics housing 24. Similarly, either or both of the night monocular vision devices 20 an be readily :removed without the need of tools. If two monocular devices 20 are attached to the electronics housing 24 the interpupillary distance between the two night vision monocular devices 20 can be selectively adjusted simply by manually moving each monocular device 20 back and forth within the T-shaped slot 56.

Since each monocular device 20 receives power from the batteries 64 in the electronics housing 24, when either monocular device 20 is removed from the electronics housing 24 the night vision monocular device 20 is automatically disabled. If two night vision monocular devices 20 are present and one is removed, the operation of the remaining monocular device is unaffected. Consequently, the present invention night vision assembly 10 can be readily changed between a binocular goggle arrangement and a monocular goggle arrangement as desired.

An inverted T-shaped slot 70 is disposed on the top surface 71 of the electronics housing 24. Periodic reliefs 72 are formed in parallel lines along each side of the inverted T-shaped slot 70. Two electrical contacts 73, 74 are disposed on the bottom of the T-shaped slot 70 and serve a purpose which will be later described. The guide member 38 has a base 75 with a width W that enables the base 75 to slide within the T-shaped slot 70. A pivoting lever assembly 76 is disposed upon the base 75. A locking element 78 is coupled to one end of the pivoting lever assembly 76. An enlarged flattened area 79 is disposed at the opposite end of the pivoting lever assembly 76 to provide a surface easily engaged by a person's fingers. A spring (not shown) biases the locking element 78 against the base 75. The bias of the spring can be overcome by applying a predetermined force to the enlarged flattened area 79 which pivots the lever assembly and lifts the locking element 78. Two pawls 81 extend downwardly from the locking element 78. As the guide member 38 slides within the T-shaped slot 70, the pawls 81 engage the periodic reliefs 72 in the T-shaped slot 70. Accordingly, by varying which set of periodic reliefs 72 the pawls 81 engage, the position between the pivoting lever assembly 76 and the electronics housing 24 can be selectively controlled. Since the electronics housing 24 supports the night vision monocular device 20, by varying the point of interconnection between the electronics housing 24 and the guide member 38, the distance between the night vision monocular device 20 and a soldier's eyes can be selectively varied.

A hinge element 80 extends from one end of the guide member 38. Two disabling contacts 83, 84 extend from the hinge element 80. Referring to FIG. 3 in conjunction with FIG. 2, it can be seen that two conductive strips 85, 86 are disposed on the bottom surface 87 of the guide member 38. Each of the conductive strips 85, 86 is electrically insulated from the other, wherein the first conductive strip 85 is electrically coupled to the first disabling contact 83 and the second conductive strip 85 is electrically coupled to the second disabling contact 84. A short lateral conductive strip 88 is disposed at one end of the guide member 38. The lateral conductive strip 88 is insulated from both of the other two conductive strips 85, 86.

The electronics housing 24 contains an open control circuit that automatically disables the night vision monocular devices 20 should the control circuit be closed. The control circuit is coupled to the electrical contacts 73, 74 that are ascernable on the top of the electronics housing 24 within the T-shaped slot 70. The electrical contacts 73, 74 normally contact the conductive strips 85, 86 on the bottom of the guide member 38 when the guide member 38 is joined to the electronics housing 24. The conductive strips 85, 86 are isolated from one another, therefore the control circuit remains open and the night vision monocular devices 20 remain operational. However, should the electronics housing 24 be removed from the guide member 38, the electric contacts 73, 74 on the electronics housing 24 would wipe across the lateral conductive strip 88. Upon such an occurrence, the electrical contacts 73, 74 would be shorted together and the control circuit within the electronics housing would automatically disable the night vision monocular devices 20.

A pivot aperture 89 is disposed through the hinge element 80 on the guide member 38. The hinge element passes between two support arms 91, 92 that extend from the clamp assembly 36. A pivot rod 93 passes through the two support arms 91, 92 and through the pivot aperture 89, thereby pivotably interconnecting the guide member 38 to the clamp assembly 36. Two reliefs 94, 95 are formed on one side of the hinge element 80. When the hinge element 80 is joined to the clamp assembly 36, via pivot rod 93, and the night vision monocular devices 20 are being used, the lower relief 94 aligns with a threaded aperture 96 in the adjacent support arm 91. A locking pin assembly 98 is screwed into the threaded aperture 96. The locking pin assembly 98 includes a central shaft 99 that is biased into the lower relief 94 when the lower relief 94 aligns with the threaded aperture 96. The presence of the central shaft 99 in the lower relief 94 prevents the hinge element 80 from pivoting relative to the clamp assembly 36. The central shaft 99 terminates at an enlarged knob 100. By pulling the enlarged knob 100 in a direction of arrow 101, the central shaft 99 can be retracted from the lower relief 94. This enables the guide member 38 to rotate relative to the clamp assembly 36. When the guide member 38, electronics housing 24 and night vision monocular devices 20 rotate to their stowed position (See hidden lines in FIG. 1), the upper relief 95 aligns with the threaded aperture 96 and the central shaft 99 engages the upper relief 95. This locks the guide member 38 in the stowed position until the enlarged knob 100 is again engaged and the central shaft 99 is pulled from the upper relief 95. Once the central shaft 99 is pulled free of the upper relief 95, the guide member 38 can again be rotated down into its operational position.

A leaf spring element 102 is positioned on top of the clamp assembly 36. The spring element 102 is biased against the contoured face surface 104 of the hinge element 80. The curvature of the contoured face surface 104 acts in conjunction with the spring element 102 so that the spring element 102 biases the guide member 38 into either its operation position or its stowed position, which ever is closer. Accordingly, the spring element helps prevent the guide member 38 from being accidently left in between either the operational position or the stowed position.

When the guide member 38 is turned to its stowed position, the disabling contacts 83, 84 abut against the spring element 102. The spring element 102 shorts the separate contacts, completing a circuit. As has been previously described, the disabling contacts 83, 84 are coupled to a control circuit within the electronics housing 24. As the disabling contacts 83, 84 are shorted and the control circuit closed, the night vision monocular devices 20 are automatically disabled. Accordingly, when the night vision monocular devices 20 are rotated up to their stowed position, they automatically shut off to prevent the person wearing the nigh vision assembly 10 from being bathed in light from the ocular lens assemblies 22.

An L-shaped member 110 is pivotably joined to the main body 120 of the clamp assembly 36, wherein a pivot rod 111 passes through the crux of the L-shaped member 110. A manipulative element 112 extends upwardly from the vertical section 114 of the L-shaped member 110. By the physical manipulation of the manipulative element 112, the L-shaped member 110 can be rotated about pivot rod 111. The horizontal section 116 of the L-shaped member 110 terminates at an upwardly extending finger 117. An opposite downwardly extending finger 118 is disposed on the horizontal portion 119 of the main body 120 of the clamp assembly 36. A spring 11.3 is disposed between the vertical section 114 of the L-shaped member 110 and the main body 120. The spring 113 biases the L-shaped member 110 into a set position where there is a distance D in between the downwardly extending finger 118 and the upwardly extending finger 117. The distance D is varied by the movement of the manipulative element 1.12 and the corresponding pivotable movement of the L-shaped member 110.

The mounting brace 34 has a faceplate 121 that includes a U-shaped relief 123. The mounting brace 34 has a width W2 from the bottom of mounting brace 34 to the bottom surface 124 of the U-shaped relief 123. The horizontal portion 119 of the body of the clamp assembly 36 is sized to fit within the U-shaped relief 123 in the mounting brace 34. However, the distance D in between the upwardly extending finger 117 and the downwardly extending finger 118 is normally too narrow to allow the passage of the faceplate 121 there between. By manipulating the L-shaped member 110, via the manipulative element 112, the distance D can be increased to a size that does enable the passage of the faceplate 121. Once the mounting brace 34 passes the upwardly extending finger 117 and the downwardly extender finger 118, the L-shaped member 110 can be allowed to return to its nominal position as influenced by the bias of spring 113. Once the L-shaped member 110 returns to its set position, the face plate 121 of the mounting brace 34 becomes locked in place, thereby joining the clamp assembly 36 to the mounting brace 34. To detach the mounting brace 34 from the clamp assembly 36, the manipulative element 112 is again engaged so that the distance D between the upwardly extending finger 117 and the downwardly extending finger 118 increases and enables the removal of the faceplate 121.

It will be understood that the embodiment of the present night vision goggle assembly described herein is merely exemplary and that a person skilled in the art may make various modifications and variations utilizing functionally equivalent parts to those described. All such variations and modifications are intended to be included within the scope of the invention as defined by the appended claims.

What is claimed is:

1. A modular night vision device, comprising:

a support structure having a first region and a second region positionable proximate the eyes of a person, said support structure retaining an electrical power source, and having electrical contacts in said first region and said second region that are electrically coupled to said electrical power source;

at least one night vision monocular assembly, wherein said support structure and said at least one night vision monocular assembly have an attachment means disposed therebetween that enables said at least one night vision monocular assembly to be selectively attached to said first region and said second region, and engage said electrical contacts to selectively produce a monocular or binocular assembly, wherein said at least one night vision monocular assembly is empowered by said electrical power source.

2. The device according to claim 1, further including a disabling means for automatically disabling said at least one night vision monocular assembly when said at least one night vision monocular assembly is detached from said support structure.

3. The device according to claim 1, wherein said support structure includes a hinged member that enables said support structure to be selectively moved between an operational position, where said at least one night vision monocular is disposed in front of the eyes of the person using said device and a stowed position away from the eyes of the person using said device.

4. The device according to claim 1, further including a means for biasing said at least one night vision monocular assembly into a selected set position on said support structure when said at least one night vision monocular assembly is attached to said support structure.

5. The device according to claim 1, wherein a slot is disposed on said support structure and said at least one night vision monocular device engages said slot being reciprocally movable therein, said device further including a locking means for locking said at least one night vision monocular device in said slot, thereby preventing said at least one night vision monocular device from being inadvertently removed from said slot.

6. The device according to claim 3, further including a disabling means for disabling said at least one night vision monocular assembly when said support structure is rotated to said stowed position.

7. The device according to claim 1, further including an infrared light source coupled to said support structure.

8. The device according to claim 1, further including a light sensor for detecting ambient light and a means for automatically disabling said at least one night vision monocular assembly when said light sensor detects light in excess of a predetermined threshold level.

9. A device for supporting at least one night vision monocular assembly in an operational position in front of the eyes of a person, said device comprising:

a left region proximate the left eye of the person and a right region proximate the right eye of the person wherein an attachment means is disposed in both said left region and said right region for independently receiving a night vision monocular assembly in a selectively removable fashion;

receptacle means for receiving at least one battery therein;

electrical contacts disposed in said left region and said right region, said electrical contacts being coupled electrically to said at least one battery in said receptacle means, wherein said at least one night vision monocular assembly engages said electrical contacts and is empowered by said at least one battery when coupled to said device by said attachment means; and adjustment means for adjusting the spacial distance between said at least one night vision monocular assembly and the eyes of the person.

10. The device according to claim 9, further including a hinged element wherein said at least one night vision monocular assembly can be rotated from said operational position in front of the eyes of the person to a stowed position away from the eyes of the person.

11. The device according to claim 10, further including a disabling means for disabling said at least one night vision monocular assembly when said at least one night vision monocular assembly is rotated to said stowed position.

12. The device according to claim 9, further including an infrared light source.

13. The device according to claim 9, further including a light sensor for detecting ambient light and a means for automatically disabling said at least one night vision monocular assembly when said light sensor detects light in excess of a predetermined threshold level.

14. The device according to claim 12, further including a manipulative control means for selectively enabling said infrared light source and said at least one night vision monocular assembly.

15. The device according to claim 10, wherein said night vision and said left region are disposed on a support member that is detachable from said hinged element, said device including a means for automatically disabling said at least one night vision assembly when said support member is detached from said hinged element.

16. The device according to claim 9, further including a means disposed within said left region and said right region, for retaining said at least one night vision monocular assembly in a set position within said left region and said right region wherein said set position can be selectively varied through a predetermined range.

* * * * *